3,000,703
Patented Sept. 19, 1961

1

3,000,703
MANUFACTURE OF ZIRCONIUM OXIDE
Wilhelm Brügger, Essen, Germany, assignor to Th. Goldschmidt A.G., Essen, Germany, a company of Germany
No Drawing. Filed Nov. 5, 1957, Ser. No. 694,525
10 Claims. (Cl. 23—140)

This invention relates to manufacture of zirconium oxide; and it comprises a process of producing zirconium oxide of high purity and of high bulk density, usually in granular form, wherein solid zirconium tetrachloride is treated with a gaseous hydrolyzing agent, selected from the class consisting of superheated steam and the vapors of a low-molecular aliphatic alcohol, at reactive temperatures below the sublimation point of the zirconium chloride but above the boiling point of the hydrolyzing agent, for from about 1 to 5 hours sufficient to convert the zirconium tetrachloride substantially completely into a hydrated zirconium oxide, followed by calcination of the hydrated zirconium oxide at temperatures sufficiently high to eliminate substantially all the water content of the zirconium oxide, resulting in a product analyzing from about 99.95% to 99.99% $ZrO_2$ with a high bulk density, ranging from about 85 to 105 pound per cubic foot; all as more fully hereinafter set forth and as claimed.

Zirconium oxide is noted for its high resistance to heat. This makes it a valuable refractory insulating material. It is also useful for making refractory crucibles, casting molds and the like. It is frequently mixed with various other refractory materials, such as steatite, special porcelains, etc. It is also used as a mechanically resistant carrier material for catalysts. It is further used in various optical glasses and in the production of the zirconates of alkaline earth metals and of lead. By virtue of their electrical properties these zirconates are valuable in the high-frequency electrical field.

In the prior art zirconium oxide is usually obtained from zirconium sand as a raw material. This can be accomplished by a method in which the zirconium silicate is broken down with a melt of caustic soda or soda ash, followed by leaching out the soluble sodium silicate formed in the process. The zirconium sand has also been calcined at temperatures up to 2200° C. followed by quenching to form zirconium oxide and silicic acid, the latter being removed by treatment with caustic alkali. These methods leave at least a small residue of sodium oxide in the reaction product and, as is well known, this residue seriously impairs the refractory properties of the product.

In another procedure the zirconium sand is calcined with lime or with mixtures of lime and magnesia. This results in the production of an alkaline earth zirconate from which a zirconium oxide can be recovered substantially free from alkali but, unfortunately, containing silicic acid as an impurity. In still another prior method zirconium sand is heated with carbon in an electric furnace with the exclusion of air. This results in the volatilization of silicon monoxide but it is impossible to remove all the silica in this manner.

It should be noted that the above-described prior art methods produce zirconium oxide products which contain residues of either alkali or silica which impair the refractory properties of the products. Other methods are known of producing zirconium oxide of substantial purity. In one of these zirconium tetrachloride is decomposed in the vapor phase at temperatures of from about 600° to 800° C. by a flame which forms water vapor. Steam may be introduced into this flame. Highly dispersed zirconium oxide of low bulk density can be produced in this manner. But zirconium oxide has no value as a pigment or as a filler for rubber or plastic; hence such zirconium oxide products have little or no utility.

In the making of refractory objects and in the ceramic and glass industries it is preferred to have zirconium oxide in a granular form of relatively high bulk density. For this purpose it has been proposed to decompose zirconium tetrachloride in the vapor phase at temperatures of from about 1500 to 1800° C., in the attempt to produce at least a small amount of crystal growth in the zirconium oxide product. The product produced in this manner has a somewhat higher bulk density than those of the products produced by the decomposition of zirconium tetrachloride at lower temperatures. A wet method has also been employed for making pure zirconium oxide, in which the zirconium salt in an aqueous solution thereof is hydrolytically decomposed to form a so-called "basic" salt, this being filtered off and calcined to remove the acid. But this method is expensive in that large volumes of liquids must be handled and the filtration step requires a long time.

I have now discovered a relatively inexpensive and simple method of obtaining a high-purity zirconium oxide having a high bulk density varying from about 85 to 105 pounds per cubic foot and usually in a porous granular form, ideal for making refractory objects as well as for use in the ceramic and glass industries. In the first step of this method zirconium tetrachloride is treated while in solid form with an excess of the vapors of a hydrolyzing agent, selected from the class consisting of superheated steam and low-molecular aliphatic alcohols in vapor form. This results in the formation of a hydrated zirconium oxide. In the second step this hydrated zirconium oxide is calcined to remove the water and the desired pure zirconium oxide of high bulk density results.

It will be noted that in the described process the reaction between the zirconium tetrachloride and steam or alcohol vapor takes place with the zirconium tetrachloride in the solid phase and being topochemically converted by the hydrolyzing vapors into an oxidic compound. In order that the zirconium tetrachloride remain in the solid state during the reaction it is necessary, of course, to keep the temperature in the reaction zone below the sublimation point (331° C.) of the zirconium tetrachloride. Reaction temperatures ranging from about 120° to 310° C. can be employed while the preferred temperature range is from about 220° to 290° C. At these temperatures a zirconium oxide is formed containing a relatively small amount of water corresponding approximately to the formula $ZrO_2 \cdot H_2O$. The equation of the reaction is approximately:

$$ZrCl_4 + 3H_2O \rightarrow ZrO_2 \cdot H_2O + 4HCl$$

The conditions are suitable for the polymerization of the hydrated zirconium oxide and therefore lead to coarsely granular products. At the low reaction temperatures employed in my process the vapor pressure of the zirconium tetrachloride is so low that no more than traces are volatilized; hence no reaction takes place in the vapor phase. Neither is there any formation of zirconium oxychloride due to the condensation of steam in the reaction zone. The reaction between the solid zirconium tetrachloride and the steam is highly exothermic at 220° C. and localized overheating takes place at the points where the reaction takes place.

I have also discovered it is possible to conduct my reaction with the zirconium tetrachloride in rather coarse lumps. The reaction with the steam or alcohol vapor proceeds from the outer surface inwardly and hence takes longer than in the case of finely-divided zirconium tetrachloride. At the conclusion of the process the lump form is preserved but the hydrolytic reaction has made the lumps porous. The product usually contains only from about 4 to 6% water, when temperatures of from 220 to 240° C. are emloyed and about the same amount of hydrogen chloride is dissolved in the water present. But the hydrogen chloride is not bound to the zirconium, which is shown by the fact that, upon calcination, no zirconium is lost.

As indicated previously it is possible to employ one of the low-molecular aliphatic alcohols, containing from 1 to 5 carbon atoms, as a hydrolytic agent in place of the steam. This forms a convenient method of converting the alcohol into the corresponding alkyl chloride. The hydrogen chloride formed during the hydrolytic conversion of the tetrachloride is almost quantitatively converted into the alkyl chloride, thus upgrading the hydrogen chloride and eliminating the problem of its disposal. The reaction is conducted, of course, at a temperature above the boiling point of the alcohol employed. Suitable temperatures range from about 120° to 310° C., while the preferred range is from about 260° to 290° C.

While it is quite possible that intermediate products are formed in my process, the most likely equations involved in the reaction are as follows:

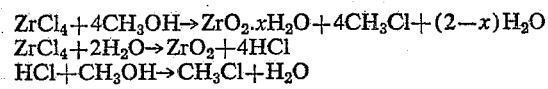

The hydrated zirconium oxide and the zirconium tetrachloride act catalytically to release water from the alcohol employed in the process. This water vapor then reacts with the zirconium tetrachloride to produce the oxide and hydrogen chloride, the latter reacting with the alcohol to form alkyl halide, as indicated in the above equations. Small amounts of impurities are produced by secondary reactions, these being dialkyl ethers and olefins. The ethers are formed when 2 molecules of alcohol release 1 molecule of water and the olefins when one molecule of alcohol releases one molecule of water. The latter reaction, of course, cannot occur when methanol is employed as the alcohol. The formation of ethers during the process does not become significant until toward the end of the reaction when the chlorine of the zirconium tetrachloride has been substantially eliminated. The formation of olefins increases with the molecular weight of the alcohol used in the process.

When the zirconium tetrachloride is employed in lump form I have found it advantageous to convert only from about 70 to 80% by weight with methanol, for example, and to complete the reaction with steam. This will cause by far the greater portion of the hydrogen chloride formed to be utilized in the production of methyl chloride. The cause for this phenomenon, presumably, is that the alcohol penetrates the lumps of zirconium tetrachloride more slowly than steam and, after the surface of the lumps has been converted into the hydrated oxide, the reaction slows down, but it speeds up again if steam is substituted for the alcohol.

The zirconium tetrachloride used in my process can, of course, be highly purified by subliming it in an atmosphere of hydrogen, for example. This highly purified zirconium tetrachloride can be converted almost quantitatively in my process into a zirconium oxide having a purity of from about 99.95% to 99.99%. And, as indicated previously, this can be obtained in a coarsely granular state with a high bulk density.

It is possible in my process to employ a two-step heating procedure. Thus the main reaction can be conducted at a temperature of about 220°, for example, and then the temperature can be raised quickly to from about 500° to 550° C. for about 30 minutes without causing any significant loss of zirconium tetrachloride through volatilization. This modification produces a zirconium oxide containing from 99% to 99.5% of the oxide, very small amounts of water and from about 0.05 to 0.01% of hydrogen chloride. If a higher purity is required, calcination for about 2 hours at a temperature of about 900° to 1200° C. will produce a product containing from 99.95% to 99.99% zirconium oxide.

My invention can be described in greater detail by reference to the following specific examples which represent practical embodiments of my process:

*Example 1*

In a horizontal heated porcelain tube fitted with an admission pipe at one end for steam and an exit pipe at the other end for exhaust gas, 600 parts by weight of pure, solid zirconium tetrachloride are treated for about 1 to 1½ hours with 1000 parts by weight of superheated steam at a temperature of 220° C. Upon completion of the reaction, the product contains 89 to 90% zirconium oxide, about 5% water and 5 to 6% hydrogen chloride. This hydrated zirconium oxide is then calcined for 2 to 3 hours at about 1000° C. The result is a quantitative yield of 317 parts by weight of zirconium oxide with a 99.98% content of $ZrO_2$.

*Example 2*

In the same apparatus as described in Example 1, 600 parts by weight of pure, solid zirconium tetrachloride are treated for 1 hour with 1000 parts by weight of steam between 220 and 240° C. Then for about half an hour the temperature is raised to roughly 500–550° C. During this period a further 500 parts by weight of steam are passed through the reaction tube. The resultant intermediate product contains about 99.5% zirconium oxide and about 0.05% hydrogen chloride. At the end of two hours' calcination at 1000° C. of this hydrate of zirconium oxide, which contains only a small percentage of water, a quantitative yield of 317 g. of a 99.98% zirconium oxide is obtained.

*Example 3*

In a horizontal quartz tube provided at one end with an admission pipe and at the other end an exit pipe for the discharge of gas, 380 parts by weight of pure zirconium tetrachloride in solid form are treated for 5 hours with 330 parts by weight of methanol vapour at 280° C. The methyl chloride recovered from the exit gases is purified from small traces of dimethyl ether and of unreacted methanol and moisture by means of NaOH and HCl and it is then liquefied in a refrigerated trap. If the process of converting the $ZrCl_4$ into $ZrO_2$ with methanol is concluded when 80% of the chlorine in the zirconium tetrachloride has been reacted, the solid reaction product will contain about 76 to 78% zirconium oxide as well as chlorine and moisture. 236 parts by weight of methyl chloride are recovered. This corresponds with a 95% yield of the chlorine contained in the zirconium tetrachloride. The reaction is then completed by passing 170 parts by weight of superheated steam through the tube in the course of about 30 minutes. This produces a 90% zirconium oxide which can be quantitatively converted into a pure 99.98% zirconium oxide by 2 hours' calcination at 1000° C.

*Example 4*

If the methanol used in the above process is replaced by 470 parts of vaporized ethyl alcohol, the exit gases towards the end of the process contain small amounts of diethyl ether and ethylene. These impurities are removed and separated by conventional methods from the ethyl chloride which forms the bulk of the gaseous reaction products. The zirconium oxide recovered after the calcination step analyzes 99.95% $ZrO_2$.

*Example 5*

The chlorine contained in the zirconium tetrachloride can be very largely utilized for the formation of alkyl chloride with the simultaneous practically quantitative utilization of the corresponding alcohol, by adjusting the velocity of flow of the alcohol in such a way that considerable quantities of hydrogen chloride can escape. This is then absorbed in the methanol that is to be used for the reaction. For the purpose of the steam treatment of the zirconium tetrachloride, that has already been largely converted into zirconium oxide, it is advantageous to make use of the water formed during the reaction, which in addition to hydrogen chloride also contains methanol and small amounts of dimethyl ether. If 250 parts by weight of zirconium tetrachloride are thus treated with 155 parts by weight of methanol vapor at temperatures between 270° and 340° C., 195 parts by weight of methyl chloride will be obtained, the equivalent of an approximately 83% yield based on methanol, and of 90% based on the chlorine contained in the zirconium tetrachloride. The zirconium oxide formed, which contains not more than 1 to 3% chloride and about 1% carbon, is then transformed into pure zirconium oxide as described in Example 1.

While I have disclosed what I consider to be the most advantageous embodiments of my invention, it is evident, of course, that various modifications can be made in the specific procedures which have been described without departing from the purview of this invention. Thus my process can be conducted in a continuous manner. In this case the reaction chamber employed is usually a slightly-inclined, slowly-rotating cylindrical tube into the top of which the zirconium tetrachloride in lump form is fed continuously with exclusion of air through a conventional feeding device which constitutes a trap sealed to the rotating tube. The inlet tube for supplying superheated stem is at the same end of the rotary tube and this passes through a packing gland and extends some distance into the interior of the rotating tube. The rotary tube is mounted inside a furnace which supplies sufficient heat to produce a temperature of from about 220° to 290° throughout most of the length of the tube. If it is desired to reduce the moisture content below about 1%, it is possible to heat the lower end of the tube to temperatures of from about 400° to 500° C. Passage of the zirconium tetrachloride through the rotary tube should take from about 1 to 3 hours depending upon the temperatures employed, the degree of dehydration desired and the size of the lumps of zirconium tetrachloride.

Unless a very long reaction tube is employed it is not practical to use an alcohol in the continuous process as the hydrolyzing agent. It would require a retention time of about 5 hours in the tube. It will be noted that the flows of zirconium tetrachloride and hydrolyzing agent are in parallel. The exit gases are passed through a washing tower to recover the HCl.

Owing to the granular nature, high bulk density and purity of my zirconium oxide product it can easily be processed into highly refractory articles, structural materials, etc. and it can also be employed with excellent results in the glass and ceramic industries. Owing to the low reaction temperatures employed, it is possible to employ cheap linings in the reaction tubes used in the process at a substantial saving. Another saving is due to the fact that no electrical dust precipitation apparatus is required owing to the use of solid zirconium tetrachloride in the process. Other advantages and modifications of my process which fall within the scope of the following claims will be immediately evident to those skilled in this art.

What I claim is:

1. A process for the production of zirconium oxide which comprises:
   (a) introducing solid zirconium tetrachloride into a reaction zone,
   (b) simultaneously introducing into the reaction zone a hydrolyzing agent,
   (c) said hydrolyzing agent having the formula ROH wherein R is selected from the group consisting of hydrogen and alkyl radicals containing between one and five carbon atoms,
   (d) maintaining the temperature in the reaction zone above the boiling point of the hydrolyzing agent but below the sublimation point of the zirconium tetrachloride,
   (e) maintaining the said reactants in the reaction zone for from about 1–5 hours in order to substantially eliminate the chloride from the resulting zirconium oxide product, and
   (f) thereafter calcining the resulting product to convert hydrous zirconia to zirconium oxide.

2. The process of claim 1 wherein the temperature employed in the process is within the range of from about 120–310° C.

3. The process of claim 2 wherein the temperature employed is within the narrower range of from 220–290° C.

4. The process of claim 1 wherein the said hydrous zirconium is calcined at a temperature within the range of from about 900–1200° C. to produce a product containing from about 99.95% to 99.99% zirconium oxide.

5. The process of claim 1 wherein about 80% of the chloride in the zirconium tetrachloride is eliminated by treatment thereof with an aliphatic alcohol containing 1–5 carbon atoms, the remaining chlorine being removed by further treatment with steam.

6. The process of claim 1 wherein said 1–5 hour heating step is followed by a second shorter heating step of 1–30 minutes duration conducted with steam at a temperature of from about 400–600° C.

7. The process of claim 1 wherein methanol is the hydrolyzing agent employed.

8. The process of claim 1 wherein the hydrolyzing agent employed is ethanol.

9. The process of claim 1 wherein the reaction is conducted in a continuous manner.

10. In the production of zirconium oxide in a granular form and analyzing from about 99.95% to 99.99% $ZrO_2$, the process which comprises purifying zirconium tetrachloride by sublimating it in an atmosphere of hydrogen, reacting the purified product while in the solid form with superheated steam at a temperature within the range of from about 220° to 290° C. for a period of from about 1 to 3 hours until the chlorine content of the zirconium tetrachloride has been eliminated, then calcining the resulting hydrous zirconia at a temperature ranging from about 900–1200° C. to eliminate its water content and produce a granular product analyzing from about 99.95% to 99.99% $ZrO_2$.

References Cited in the file of this patent

UNITED STATES PATENTS

| | | |
|---|---|---|
| 1,308,576 | Calvert et al. | Nov. 5, 1917 |
| 1,308,577 | Calvert et al. | Nov. 5, 1917 |
| 2,635,946 | Weber et al. | Apr. 21, 1953 |
| 2,670,275 | Olson et al. | Feb. 23, 1954 |
| 2,791,490 | Willcox | May 7, 1957 |

FOREIGN PATENTS

| | | |
|---|---|---|
| 307,881 | Great Britain | June 11, 1930 |
| 1,040,886 | France | May 27, 1953 |
| 1,094,146 | France | Dec. 24, 1954 |

OTHER REFERENCES

Mellor: "Comprehensive Treatise on Inorganic and Theoretical Chemistry," Longmans, Green and Co., New York, pp. 124, 143, 144 (1927), vol. 7.

Hampel: "Rare Metals Handbook," Reinhold Publishing Corp., New York, 1954, page 604.